US 9,273,666 B2

(12) United States Patent
Kheirandish

(10) Patent No.: US 9,273,666 B2
(45) Date of Patent: Mar. 1, 2016

(54) MAGNUS TYPE WIND POWER GENERATOR

(71) Applicant: Hamid Reza Kheirandish, Yazd (IR)

(72) Inventor: Hamid Reza Kheirandish, Yazd (IR)

( * ) Notice: Subject to any disclaimer, the term of this patent is extended or adjusted under 35 U.S.C. 154(b) by 0 days.

(21) Appl. No.: 14/016,131

(22) Filed: Sep. 1, 2013

(65) Prior Publication Data

US 2015/0061294 A1 Mar. 5, 2015

(51) Int. Cl.
*F03D 9/00* (2006.01)
*H02P 9/04* (2006.01)
*F03D 1/06* (2006.01)

(52) U.S. Cl.
CPC .................................... *F03D 1/0616* (2013.01)

(58) Field of Classification Search
USPC ...................................................... 290/44, 55
See application file for complete search history.

(56) References Cited

U.S. PATENT DOCUMENTS

| 3,861,607 | A | * | 1/1975 | Schippers et al. | 242/481.8 |
| 3,945,581 | A | * | 3/1976 | Schippers et al. | 242/481.8 |
| 4,065,953 | A | * | 1/1978 | Frentzen et al. | 72/393 |
| D252,572 | S | * | 8/1979 | Hanson | D15/1 |
| 4,180,372 | A | * | 12/1979 | Lippert, Jr. | 416/23 |
| 4,366,386 | A | | 12/1982 | Hanson | |
| 4,401,284 | A | * | 8/1983 | Austin | 244/21 |
| 4,446,379 | A | * | 5/1984 | Borg et al. | 290/55 |
| 4,582,013 | A | * | 4/1986 | Holland, Jr. | 114/39.3 |
| 6,361,271 | B1 | * | 3/2002 | Bosley | 415/72 |
| 6,375,424 | B1 | * | 4/2002 | Scarpa | 416/4 |
| 7,504,740 | B2 | * | 3/2009 | Murakami et al. | 290/55 |
| 7,986,054 | B2 | * | 7/2011 | Douglas | 290/54 |
| 8,253,264 | B2 | * | 8/2012 | Becker | 290/54 |
| 8,836,159 | B2 | * | 9/2014 | Aoki | 290/55 |
| 2002/0119040 | A1 | * | 8/2002 | Bosley | 415/72 |
| 2007/0046029 | A1 | * | 3/2007 | Murakami et al. | 290/55 |
| 2010/0038915 | A1 | * | 2/2010 | Murakami | 290/55 |
| 2012/0217757 | A1 | * | 8/2012 | Aoki | 290/55 |

FOREIGN PATENT DOCUMENTS

JP 07313823 A * 12/1995 ............ B01D 39/16

* cited by examiner

*Primary Examiner* — Pedro J Cuevas
(74) *Attorney, Agent, or Firm* — Azadeh Saidi

(57) ABSTRACT

A Magnus type wind power generator (A) comprising a horizontal rotary shaft (3) for transmitting torque to a power generating mechanism (2), rotary columns (5), flow directing plane (7) installed at main shaft (3), driving motors (15) for rotatively driving the respective rotary columns (5) around the axes thereof, which the relative action between rotation of each rotary column (5) and wind produces Magnus lift, which rotates the horizontal rotary shaft (3) so as to drive the power generating mechanism (2). Firstly, air flow directing plane (7), installed to direct flow to the low pressure area so as to cause another delay and eventually increase the Magnus lift. Secondly, the crossed spiral on the surface of the cylinder (6) provided to generate more air flow in three directions upon the rotary cylinder (5) increases the Magnus force.

9 Claims, 10 Drawing Sheets

135 degree

MAGNUS TYPE WIND POWER GENERATOR

TECHNICAL FIELD

The present invention relates to a Magnus type wind power generator which causes Magnus lift generated by interactions between rotations of respective rotary columns and wind power to rotate a horizontal rotary shaft, thereby driving a power generating mechanism.

BACKGROUND ART

Although, as effective wind power generators, there have been realized ones using a Savonius wind turbine, the Savonius wind turbine cannot rotate faster than a wind speed, presents a low power generation capability, and thus is not suitable for a high power generation. On the other hand, as a practical wind power generator with a relatively high power generation capability, although there are ones using a propeller type wind turbine, they have a problem that the efficiency thereof cannot be increased in a relatively low wind speed range.

In addition to these types, there have already been publicly known Magnus type wind power generators which generate an electric power by causing a required number of rotary columns provided radially with respect to a horizontal rotary shaft to generate Magnus lift thereby rotating the horizontal rotary shaft (refer to patent documents 1 and 2).

Patent document 1: U.S. Pat. No. 4,366,386
Patent document 2: U.S. Pat. No. 7,504,740 A1

DISCLOSURE OF THE INVENTION

Problems to be Solved by the Invention

A Magnus type wind power generator described in the Patent document 1 generates a power by rotating rotary columns to generate Magnus lift, thereby rotating a horizontal rotary shaft to generate an electric power, and it is thus necessary to increase the rotational speed of the rotary columns to increase the Magnus lift for increasing the amount of the electric power to be generated. However, a large amount of energy is consumed in order to rotate the rotary columns at a high speed, resulting in a decrease of power generation efficiency.

A Magnus type wind power generator described in the Patent document 2 generates a power by rotating spiral columns to generate Magnus lift, thereby rotating a horizontal rotary shaft to generate an electric power, the rotary columns increase the drag force and this increase causes a huge amount of power to rotate the rotary columns which results in reduction in power generation.

The present invention provides a Magnus type wind power generator which solves these problems all at once.

Means to Solve the Problem

To solve the above problems, a Magnus type wind power generator including a horizontal rotary shaft that transmits a rotation torque to a power generating mechanism, a required number of rotary columns disposed radially from the horizontal rotary shaft, and driving motors that rotatively drive the respective rotary columns about axes thereof, where Magnus lift generated by interactions between the rotations of the respective rotary columns, flow directing plane and wind power is caused to rotate the horizontal rotary shaft to drive the power generating mechanism, is characterized in that at predetermined positions are provided air flow means and flow directing planes that respectively generate air flows upon outer peripheral surface of the rotary columns and in their back so as to increase the Magnus lift.

The present invention is based upon a novel principle that, other than a natural wind and movements of air in surface layers of the rotary columns which rotate with the rotary columns, the Magnus lift generated by the interactions between the rotations of the respective rotary columns and the flow directing plane is increased by generating the air flows upon the outer peripheral surface of the rotary columns and flow directing plane, which has been discovered by the inventors, and the inventors have succeeded in increasing the rotation torque of the horizontal rotary shaft which drives the power generation mechanism, thereby remarkably increasing the power generation efficiency of the wind power generator in a wind speed range from the low wind speed to the relatively high wind speed.

In the Magnus type wind power generator the air flow means are means that generate air flow components at least parallel with axes of the rotary columns upon the outer peripheral surfaces of the rotary columns.

According to this aspect, three dimensional air flows are generated by adding the components of the air flows parallel with the axes of the rotary columns to the Magnus lift generated by the natural wind is caused by the movement of air flow on the peripheral surface of the rotary cylinder and flow directing plane in the back of the rotary columns, thus the Magnus lift or the forces exerted on the rotary columns is increased. This is practically proved. In this condition, all whirlpool air flows generated by the rotary cylinder are not far gone and directed to the high pressure area which consequently increases the Magnus lift significantly.

The air flow means are means that generate air flow components parallel with the axes of the rotary columns and in a direction departing from the horizontal rotary shaft upon the outer peripheral surfaces of the rotary columns.

According to this aspect, the Magnus lift generated upon the rotary columns is increased by causing the air flow means to generate the air flows in the direction departing from the horizontal rotary shaft upon the outer peripheral surfaces of the rotary columns.

In the Magnus type wind power generator the air flow means are means that generate air flow components parallel with the axes of the rotary columns and in a direction toward the horizontal rotary shaft upon the outer peripheral surfaces of the rotary columns.

According to this aspect, the Magnus lift generated upon the rotary columns is increased by the air flow means. This plane and the crossed spirals on the rotary cylinder, air is flown towards the horizontal rotary shaft and on the outer peripheral surface of the rotary columns.

In the Magnus type wind power generator, air flow means are planes and crossed spirals installed on the rotary cylinder and in the back of the rotary columns.

According to this aspect, during the rotation of the rotary columns, the air around the rotary columns is caused to flow by the planes, thereby increasing the Magnus lift applied to the rotary columns.

In the Magnus type wind power generator air flow directing planes are planes installed in a degree of 135° respective to the back of the columns.

According to this aspect, during the rotation of the rotary columns, it is possible to cause the air to evenly flow upon high pressure are by means of the 135° planes, thereby increasing the Magnus lift, and reducing wind noises.

In the Magnus type wind power generator caps whose diameters are larger than rotary columns are installed in the extreme ends of the columns.

According to this aspect, it has experimentally been proven that the Magnus effect increases if the end caps are provided when the air flows are generated, and according to experiments, if there are provided the end caps, the Magnus effect increases by the method where the air is caused to flow in the direction toward the horizontal Rotary shaft compared with the method where the air is caused to flow radially outward in the opposite direction.

In the Magnus type wind power generator the inner surface of the planes establish 135° with horizon in half-planes or airfoils.

According to this aspect, by providing these planes more air is directed upon the surface of the rotary columns towards the high pressure area, thus without increasing the diameter or the rotational speed of the cylinder the Magnus effect is increased.

In the Magnus type wind power generator an airfoil plane is installed in the back of the rotary columns.

According to this aspect, air flow is directed on the surface of the planes towards the high pressure area and separation of cylinder's surface level flows is avoided, resulting in another increase in generated Magnus lift on the rotary columns.

In the Magnus type wind power generator, in the extreme of airfoils a bent plane is installed.

According to this aspect, in the extreme of the airfoil an inclined plane is installed. In the back of the airfoil plane, the speed of flow is near zero, thus pressure reaches its highest and the inclined plane in the extreme of the airfoil in the front portion of the inclined plane on the way of the flow has the maximum speed and minimum pressure, thus again the Magnus lift is increased.

In the Magnus type wind power generator, the rotation speed of the rotary columns can be adjusted between high and low.

According to this aspect, since the rotary columns can have different rotation speeds, the electric power can be generated while the rotation speed of columns fluctuates according to the direction and the wind speed of the natural wind, and the rotation speed of the rotary columns is possible to increase thereby increasing the lift of the rotary columns under a normal condition, to contract the rotary columns to reduce the area to receive the wind thereby preventing a support base from being destructed, and preventing the rotary columns from being damaged upon a strong wind.

In Magnus type wind power generator the driving motors the number of which is less than the required number of the rotary columns are used to drive rotatively the respective rotary columns simultaneously.

According to this aspect it is possible to save an electric power used to drive the driving motors, thereby increasing the power generation efficiency of the wind power generator.

DESCRIPTION OF NUMERALS

Figure 1:
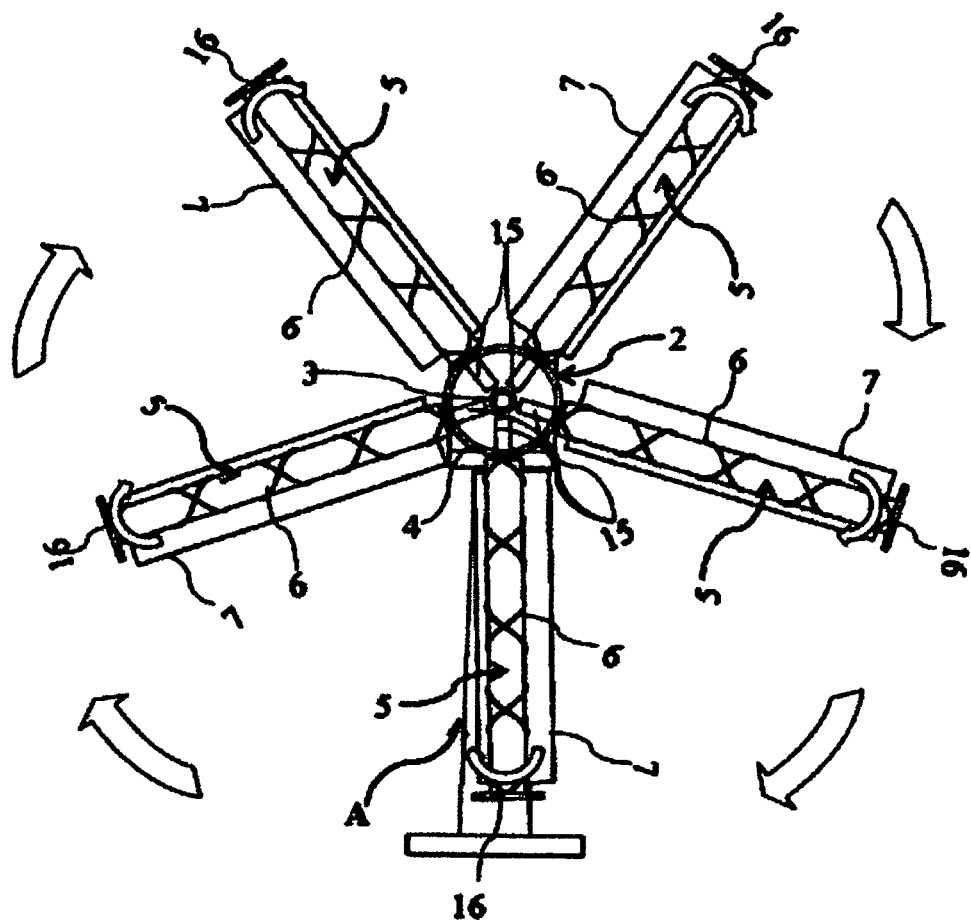
FIG. 1 is a front view showing a Magnus type wind power generator according to an embodiment 1 of the present invention.

A: Magnus type wind power generator
1: Support base
2: Power generating mechanism
3: Horizontal rotary shaft
4: Rotary body
5: rotary column
6: Rib (air flow means, fin member)
7: air flow directing plane (air flow means, fin member)
15: Driving motor
16: End cap Best Mode For Carrying Out The Invention A description will now be given of embodiments of the present invention.

Figure 2:
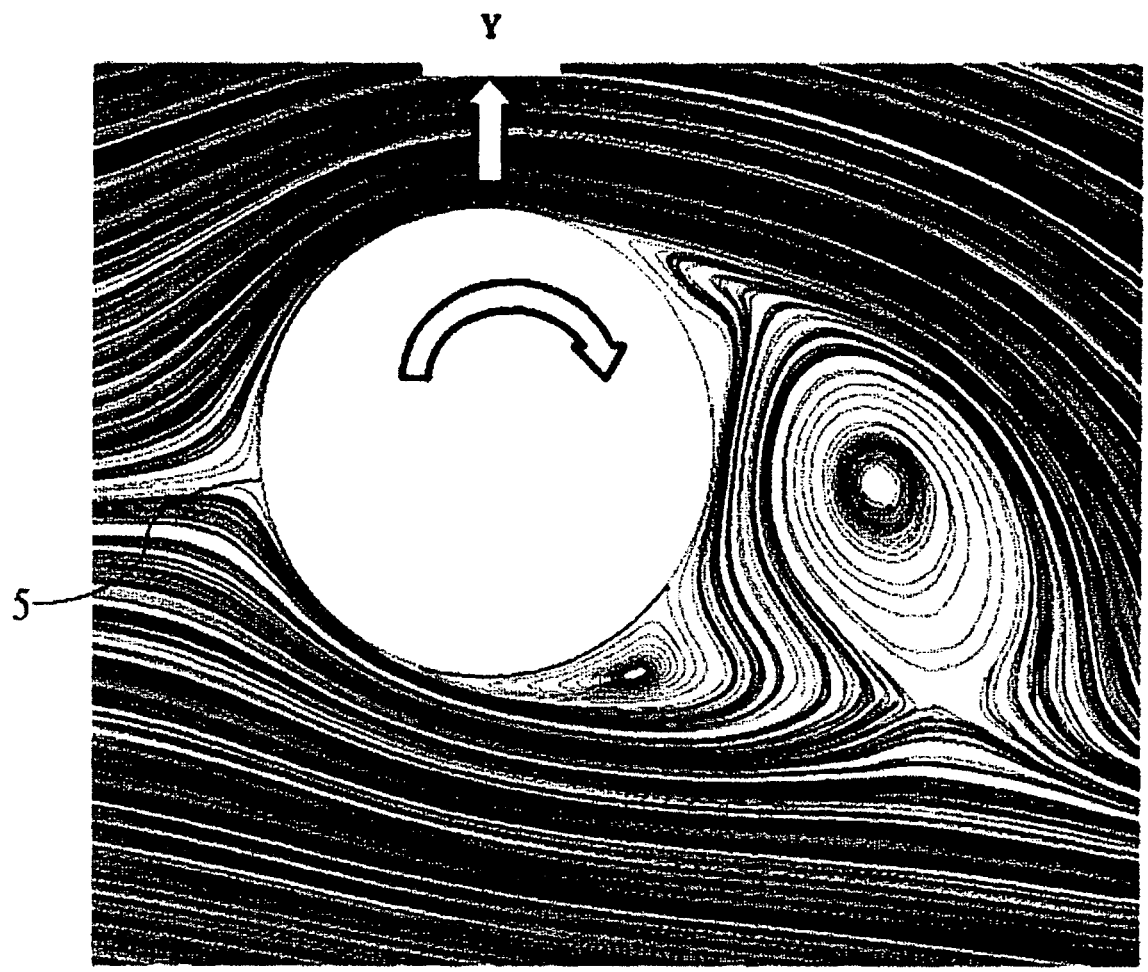
FIG. 2 is a descriptive diagram of Magnus lift.
Figure 3:
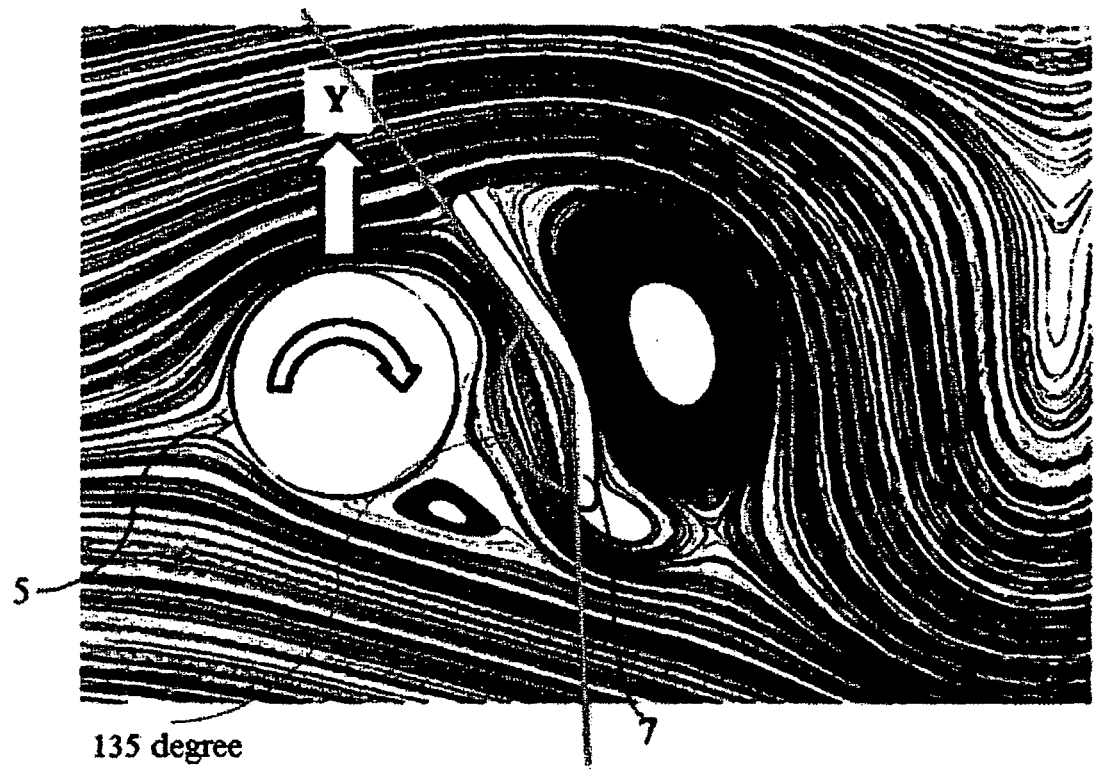
FIG. 3 is a cross sectional view of a rotary column and air flow directing plane made in a plane and in a direction indicated by A in FIG. 1.
Figure 4:
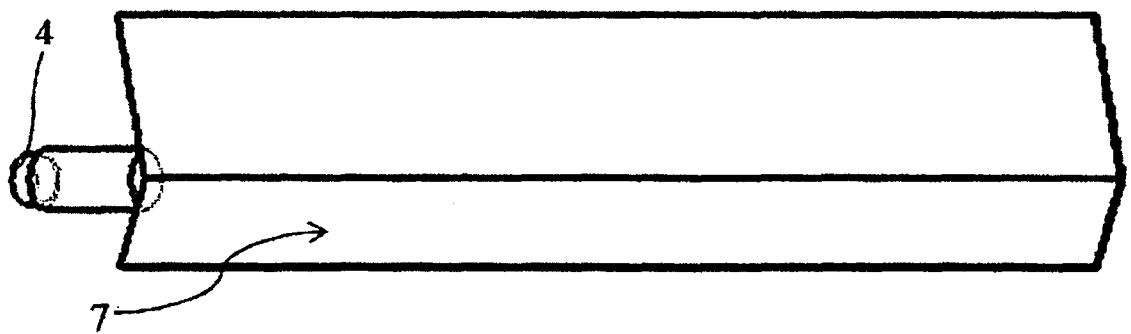
FIG. 4 is a front view showing the air flow directing plane.
Figure 5:
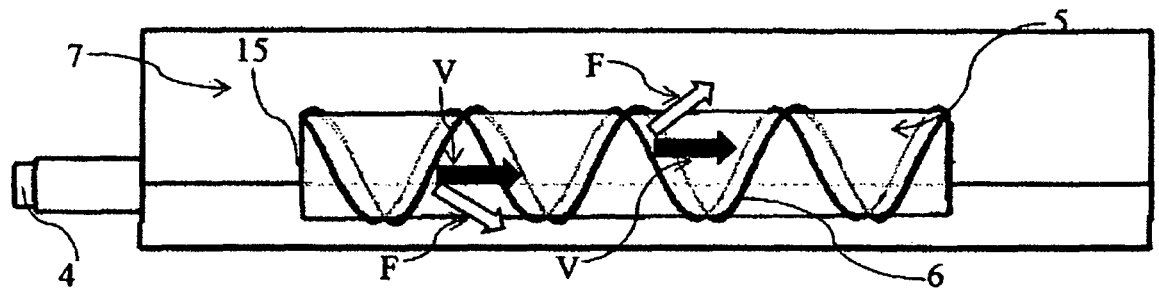
FIG. 5 is a front view showing a rotary column provided with a air flow directing plane according to an embodiment 1.

A description will now be given of a Magnus type wind power generator according to an embodiment of the present invention based upon the drawings where FIG. 1 is a front view showing the Magnus type wind power generator according to an embodiment 1 of the present invention, FIG. 2 is a descriptive diagram of Magnus lift, FIG. 3 is a cross sectional view of a rotary column with a flow directing plane made in a plane and in a direction indicated by A in FIG. 1, and FIG. 4 is a front view showing a flow directing plane, FIG. 5 is a front view of a flow directing plane with rotary columns provided with crossing ribs.

A description will be given of a mechanism and flow lines to generate general Magnus lift. As shown in FIG. 2, a flow of air which has come in contact with a front side of a rotary column 5 flows upward as the rotary column 5 rotates upon the rotational direction of the rotary column 5 and the direction of the air flow shown in FIG. 2. On this occasion, air flowing above the rotary column 5 flows faster than air flowing below the rotary column 5, there is thus generated a Magnus effect where a difference in air pressure is generated due to a negative pressure above the column 5 and a positive pressure there below, resulting in a Magnus lift Y being generated upon the rotary column 5 in a direction perpendicular to the air flow.

Reference numeral A in FIG. 1 denotes a Magnus type wind power generator to which the present invention is applied. In this Magnus type wind power generator A, a power generating mechanism 2 journalled to turn in a horizontal direction about a vertical motor (not shown) is disposed in a top portion of a support base 1 erected upon the ground. The power generating mechanism 2 includes a horizontal rotary shaft 3 journalled to rotate in the vertical direction, one end of the horizontal rotary shaft 3 is connected to a power generator (not shown) provided within the power generating mechanism 2, and the other end of the horizontal rotary shaft 3 is fixed to a rotary body 4.

As shown in FIG. 1, five driving motors 15 are provided within the rotary body 4, five rotary columns 5 are radially provided upon an outer periphery of the rotary body 4, base portions of the respective rotary columns 5 are connected to the respective driving motors 15 provided within the rotary body 4, and the respective rotary columns 5 are journalled so as to be rotated by the drive of the respective driving motors 15. Moreover, upon extreme end surfaces of the rotary columns 5 are attached end caps in a disk shape having a diameter larger than the diameter of the rotary columns 5.

Rotary columns with two crossing ribs (right and left handed) 6 and air flow directing planes 7, serving as air flow means are installed upon the outer peripheral surface of the axial rotary columns 5 and in their back. Air flow directing planes 7 can be made of a material such as synthetic resin or a material Such as weather resistant light alloy. A description will now be given of the air flow directing planes 7. As shown in FIG. 4, flow directing planes are assumed with required width and height in the back of the cylinder. The planes are shown in the figure.

When the Magnus type wind power generator A shown in FIG. 1 is used to generate an electric power, a wind direction is first detected by a wind vane (not shown), a control circuit (not shown) drives the vertical motor (not shown) to turn the power generating mechanism 2 according to the wind direction so that the wind blows against the front side of the rotary body 4. Then, the respective rotary columns 5 are rotated by the drive of the respective driving motors 15 within the rotary body 4.

Rotation direction of rotary columns 5 is independent of air flow direction, because the spiral of the ribs 6 is right and left handed.

As shown in FIG. 5, by providing the crossing spiral rib 6 upon the rotary column 5, the crossing spiral rib 6 generates flows F of the air in two directions during the rotation of the rotary column 5. On this occasion, upon the outer peripheral surface of the rotary column 5 can be generated flow components V of the air parallel with the axes of the rotary column 5 other than a natural wind and the movement of the air in a surface layer of the rotary column 5 rotating with the rotary column 5.

As confirmed by experiments described later, Magnus lift Y generated by interactions between the rotation of the respective rotary columns 5 and wind power are increased (refer to FIG. 3). On this occasion, all the air flows F generated by the air flow means are not necessarily parallel with the rotary columns 5, and a sufficient effect is provided if the air flows F have at least the vector components V parallel with the rotary columns 5. It is considered that there occur a phenomenon of an increase of the differential pressure between the negative pressure and the positive pressure acting upon the rotary columns 5, a phenomenon of an increase of a surface to generate the lift, and the like as reasons for the increase of the Magnus lift Y.

Moreover, by employing the end caps 16, an increase of the Magnus effect has experimentally been proven. Namely, by providing the end cap 16 upon the extreme end surface of the rotary column 5, the end cap 16 exerts a positive effect upon the air flows F, thereby increasing the Magnus lift Y. Moreover, as described later, according to experiments, if the end caps 16 are provided, it was found out that this method which causes the air to flow toward the horizontal rotary shaft increases the Magnus effect more than the method which causes the air to flow oppositely in the radially outward direction.

As shown in FIG. 1, the Magnus lift Y generated upon the respective rotary columns 5 rotates the rotary columns 5 and the rotary body 4 about the horizontal rotary shaft 3, thereby driving the power generator (not shown) connected to the one end of the horizontal rotary shaft 3 to generate the electric power. Moreover, by providing the flow directing planes 7 in the back of the rotary columns 5, a torque value (rotation torque) of the horizontal rotary shaft 3 driving the power generator (not shown) is increased, thereby increasing the electric power generation efficiency of the Magnus type wind power generator A. When the power generator (not shown) starts to generate an electric power, a part of the generated electric power can be supplied to the driving motors 15 used to rotate the rotary columns 5 as an auxiliary electric power to be used.

Figure 10:
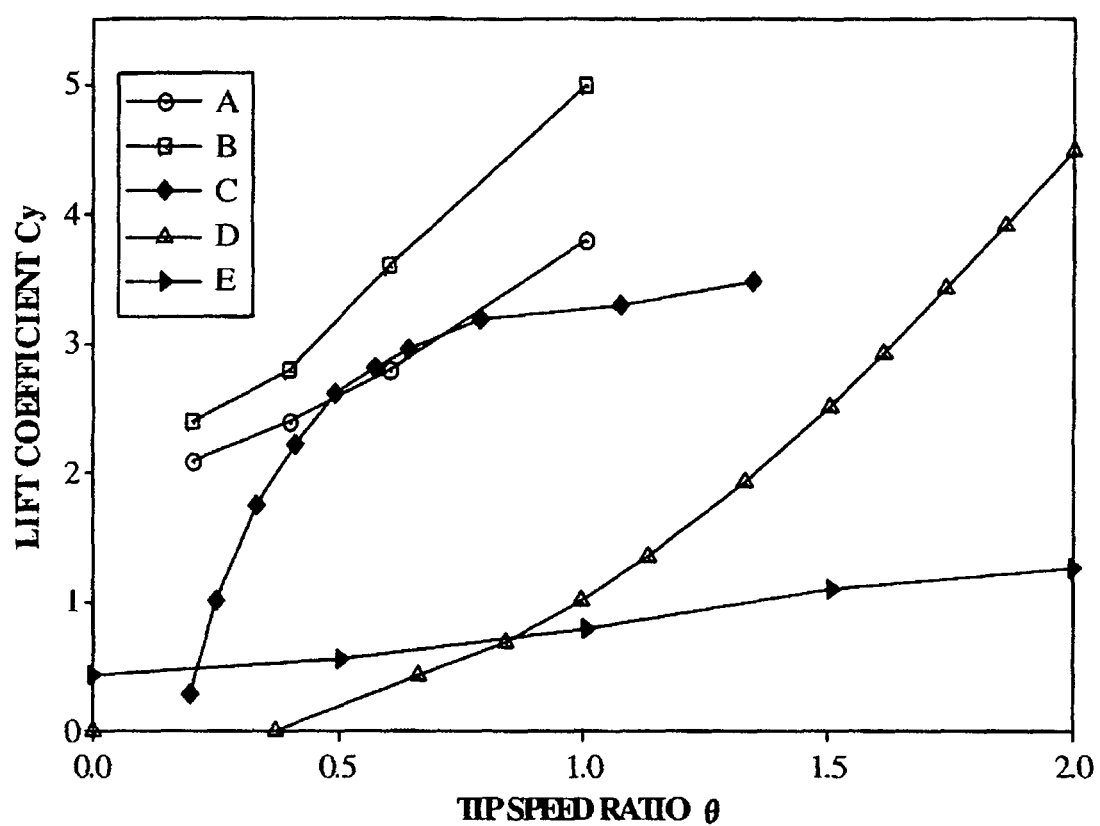
FIG. 10 is a chart of lift coefficient curve based on θ.

Proof experiments for the rotary columns 5 used for the present embodiment were carried out in a wind tunnel experimental room. A description will now be given of a tip speed ratio θ and a lift coefficient Cy for the rotary column 5 of the Magnus type wind power generator A according to the present embodiment, rotary columns in other inventions, and ideal fluid with reference to FIG. 10. FIG. 10 is a chart showing a relationship between the tip speed ratio θ and the lift coefficient Cy. If the diameter (m) of the rotary column is d, the rotational speed per second n(r/s) of the rotary column is n, and the wind speed u (m/s) is, the tip speed ratio θ of the rotary column is represented as θ=dn/2u. The lift coefficient Cy is a value obtained by dividing the lift Y by a product of energy of movement of the wind per unit :½ ρu² and a projected area of the rotary column: dl (l is the length of the rotary column), and is represented as Cy=2πθ for the ideal fluid. The tip speed ratio θ is used to keep variations in experiment results according to differences in the diameter d, the rotational speed n, and the wind speed u as less as possible, and the lift coefficient Cy is also used to keep variations in experiment results according to the wind speed u, the dimension dl of the rotary column, and the density of the fluid p as less as possible.

As shown in FIG. 10, a chart (A) and (B) represents a relationship between the tip speed ratio θ and the lift coefficient Cy of the rotary columns 5 of the Magnus type wind power generator A according to the present invention, a chart (C) represents a relationship between the tip speed ratio θ and the lift coefficient Cy of a rotary column of a Magnus type wind power generator according to JP (Japan), a chart (D) represents a relationship between the tip speed ratio θ and the lift coefficient Cy of a rotary column of a Magnus type wind power generator according to ITMA (Russia), a chart (E) represents a relationship between the tip speed ratio θ (converted value corresponding to the tip speed ratio θ of a rotary column) and the lift coefficient Cy of a wing of NACA 4415 (propeller wing with an attack angle of 12 degrees) often employed for a propeller wind turbine type wind power generator.

If the charts (A) and (B) of the rotary column 5 of the present invention is compared with the chart (C) of the rotary columns of JP and the chart (D) of the rotary columns of ITAM and the chart (E) of the wing of NACA 4415, the charts (A) and (B) of the rotary column 5 of the present invention presents a curve close to a chart of the ideal fluid (fluid which ideally flows, and does not present a loss, and for which it is not necessary to consider a friction and a separation).

Especially, in a state where the tip speed ratio θ is low (θ is equal to or less than approximately 1.5), a comparison between the charts (A) and (B) of the rotary column 5 of the present invention and the chart (C) of the rotary column of the JP shows that the lift coefficient Cy of the chart (A) of the rotary column 5 of the present invention is higher than the lift coefficient Cy of the chart (C) of the rotary column of JP.

This shows that the rotary column 5 of the Magnus type wind power generator A according to the present invention can most efficiently generate the Magnus lift Y in a state where the rotational speed n of the rotary column is low, and since the Magnus type wind power generator A according to the present invention can rotate the horizontal rotary shaft 3 with high Magnus lift Y even if the rotational speed n of the rotary columns 5 is low, it is possible to save power consumptions of the driving motors 15 used to rotatively drive the rotary columns 5, thereby efficiently generating the electric power.

A description will now be given of the end caps 16 of the Magnus type wind power generator A according to the present embodiment, a torque value N (rotation torque) of the horizontal rotary shaft 3 in the power generating mechanism 2, and the tip speed ratio θ with reference to FIG. 11. Hereinafter, in the present embodiment, the rotational direction of the rotary column 5 which causes the air flowing upon the outer peripheral surface of the rotary columns 5 to flow toward the horizontal rotary shaft 3 is referred to as a forward rotation, and the rotational direction of the rotary column 5 which causes the air flowing upon the outer peripheral surface of the rotary columns 5 to flow in the direction departing from the horizontal rotary shaft 3 is referred to as a reverse rotation.

Figure 11:
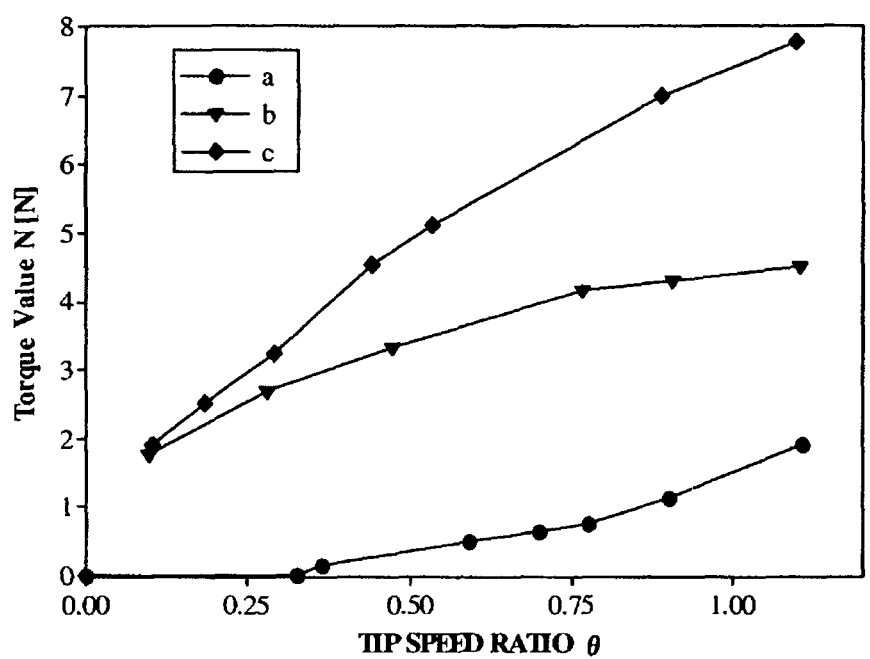
FIG. 11 is a chart of Torque value [N] curve based on θ.

FIG. 11 is a chart representing relationships between the tip speed ratio θ and the torque value N upon the rotary columns 5 with a diameter of Φ100 being rotated forward where a chart (a) shows a relationship between the tip speed ratio θ and the torque value N of the rotary column 5 without the crossing rib 6 and flow directing plane 7 and the end cap 16 being provided, a chart (b) shows a relationship between the tip speed ratio θ and the torque value N of the rotary column 5 with the flow directing plane 7 and without the crossing rib 6 with a diameter of Φ200, a chart (a) shows a relationship between the tip speed ratio θ and the torque value N of the rotary column 5 with the crossing rib 6 being provided and with the flow directing plane 7 and the end cap 16 with a diameter of 200 Φ being attached.

A comparison between the chart (a) of the rotary column 5 without the crossing rib 6 and flow directing plane 7 and end cap 16 and the chart (b) of the forward rotation of the rotary column 5 without the crossing rib 6 and with flow directing plane 7 and end cap 16 shows that since the air flow directing plane 7 increases the Magnus lift Y generated upon the rotary column 5, the torque value N of the chart (b) of the rotary column 5 with the flow directing plane 7 is higher than the torque value N of the chart (a) of the rotary column 5 without the flow directing plane 7.

Moreover, for the chart (b) and the chart (c) with the flow directing plane 7, a comparison between the chart (b) of the rotary column 5 with the end cap 16 and the chart (c) of the rotary column 5 with the crossing ribs 6 and the end cap 16 shows that the end cap 16 causes an increase of the torque value N due to the Magnus effect generated by the end cap 16 upon the rotary column 5, and a large Magnus lift Y is generated upon the surface of the rotary column 5 by providing the crossing ribs 6. Namely, the toque value N of the chart (c) of the rotary column 5 with the crossing ribs 6 is larger than the toque value N of the chart (b) of the rotary column 5 without the crossing ribs 6.

Figure 12:
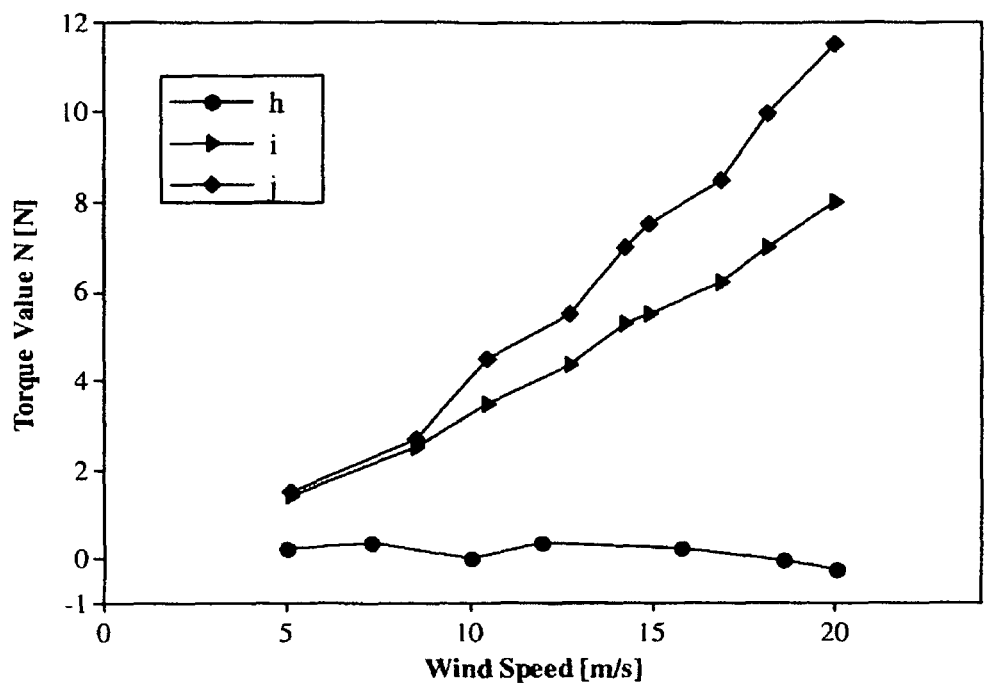
FIG. 12 is a chart of Torque value [N] curve based on Wind Speed [m/s]

A description will now be given of the flow directing plane 7 of the Magnus type wind power generator A according to the present embodiment, the torque value N (rotation torque) of the horizontal rotary shaft 3 in the power generating mechanism 2, and the wind speed u with reference to FIG. 12. FIG. 12 is a chart showing a relationship between the wind speed u and the torque value N when the rotary column 5 is rotated at a rotational speed of $\{min^{-1}\}$ 1080 where a chart (h) shows a relationship between the wind speed u and the torque value N for the rotary column 5 without the flow directing plane 7 and the crossing rib 6, and a chart (i) shows a relationship between the wind speed u and the torque value N for the rotary column 5 with the flow directing plane 7 and without the crossing rib 6, and a chart (j) shows a relationship between the wind speed u and the torque value N for the rotary column 5 with the flow directing plane 7 and the crossing rib 6.

Namely, a comparison between the chart (h) of the rotary column 5 without the flow directing plane 7 as means to add the air flows along the rotary column 5 and the chart (i) of the rotary column 5 with the flow directing plane 7 shows that although the torque value N of the chart (h) of the rotary column 5 without the flow directing plane 7 is approximately constant independently of the wind speed u, the torque value N of the chart (i) of the rotary column 5 with the flow directing plane 7 increases as the wind speed u increases, which shows that the wind power is efficiently converted into the Magnus lift Y.

Moreover, for the chart (i) and the chart (j) of the rotary column 5 with the flow directing plane 7, a comparison between the chart (i) of the rotary column 5 without the crossing ribs 6 and the chart (j) of the rotary column 5 with the crossing ribs 6 shows that the crossing ribs 6 upon the rotary column 5 causes an increase in the generated Magnus lift which in fact by providing the crossing ribs 6 a large amount of Magnus lift is generated upon the surface of the rotary column 5. Namely, the toque value N of the chart (j) of the rotary column 5 with the crossing ribs 6 is larger than the toque value N of the chart (i) of the rotary column 5 without the crossing ribs 6.

This shows that the rotary columns 5 of the Magnus type wind power generator A according to the present invention can generate the Magnus lift Y most efficiently from the normal condition where the wind speed of the natural wind is low to the strong wind condition where the wind speed thereof is high, a rotational efficiency of the horizontal rotary shaft 3 thus can be increased, and it is consequently possible to produce a Magnus type wind power generator A with a low energy loss, and to generate the electric power in the wind speed range from the low wind speed to the high wind speed of the natural wind.

Moreover, as shown in FIG. 12 in the chart (h) of the rotary column 5 without the flow directing plane 7, if the wind speed u becomes 20 u, an inverse Magnus effect is generated to cause the torque value N to present a negative value while the rotary column 5 provided with the flow directing plane 7 shown in the chart (i) is hardly affected by the inverse Magnus effect, thereby increasing the torque value N.

Figure 13:
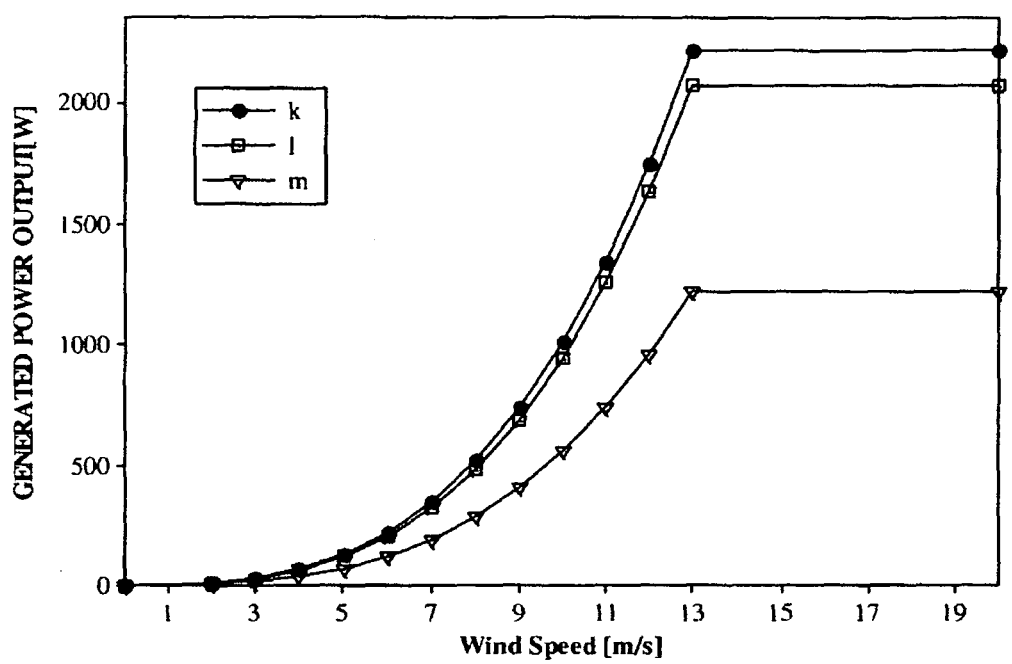
FIG. 13 is a chart of Generated power output [W] curve based on Wind Speed [m/s]

Then, a proof experiment was carried out outdoors using the Magnus type wind power generator A according to the present embodiment, and a description will now be given of the wind speed and generated power outputs W of the Magnus type wind power generator A according to the present embodiment and a propeller wind turbine type wind power generator with reference to FIG. 13. FIG. 13 is a chart showing a relationship between the wind speed and the generated power outputs W of the Magnus type wind power generator A according to the present embodiment and the propeller wind turbine type wind power generator, each having a wind turbine diameter of 2 m where a chart (m) shows the wind speed and the generated power output W of the conventional propeller wind turbine type wind power generator, a chart (I) shows the wind speed and the generated power output W of the Magnus type wind power generator JP (Japan), a chart (k) shows the wind speed and the generated power output W of the Magnus type wind power generator A according to the present embodiment.

A comparison among chart (m) which shows the generated power output W of the conventional propeller wind turbine type wind power generator and chart (I) which shows the generated power output W of the Magnus type wind power generator JP (Japan) and chart (k) which shows the generated power output W of the Magnus type wind power generator according to the present embodiment, shows that the generated power output W of the Magnus type wind power generator according to the present embodiment is higher than both the generated power output W of the conventional propeller wind turbine type wind power generator and the generated power output W of the Magnus wind power generator JP (Japan).

This implies that, for the natural wind with the wind speed in a low speed range (5 m or less), which most frequently occurs around year, the Magnus type wind power generator A according to the present embodiment can generate the electric power with a higher efficiency than the propeller wind turbine type wind power generator, and it is possible to employ the Magnus type wind power generator A according to the present embodiment to secure a more annual generated power.

Embodiment 2

A description will now be given of air flow means of a rotary column 5 and the flow directing plane 7 according to an embodiment 2 with reference to FIG. 6. It should be noted that configurations same as the above-described configurations will be explained in no more detail.

Figure 6:
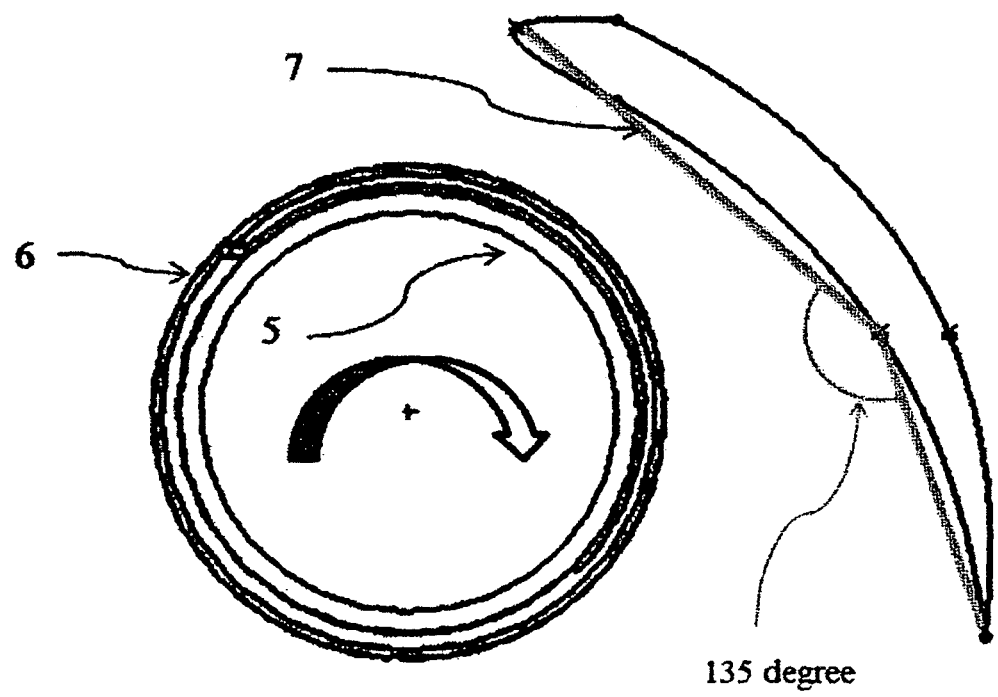
FIG. 6 is a perpendicular view showing a rotary column provided with a groove with an airfoil air flow directing plane according to embodiment 2.

FIG. 6 is a front view showing the rotary column 5 provided with a curvature (airfoil) on the flow directing plane 7 according to the embodiment 2. Crossing ribs 6 are provided on the surface of the covering material of the rotary column 5 to increase more flow of air. The material is made of a synthetic resin or weather resistant light alloy. According to this embodiment the flow directing plane 7 in the form of airfoil is used as air flow means. The flow directing plane 7 is installed at a certain distance in the back of the rotary column 5, thereby by the installation of flow directing plane in airfoil 7, a large Magnus lift Y is generated.

Embodiment 3

A description will now be given of air flow means of a rotary column 5 according to an embodiment 3 with reference to FIG. 7. It should be noted that configurations same as the above-described configurations will be explained in no more detail.

Figure 7:
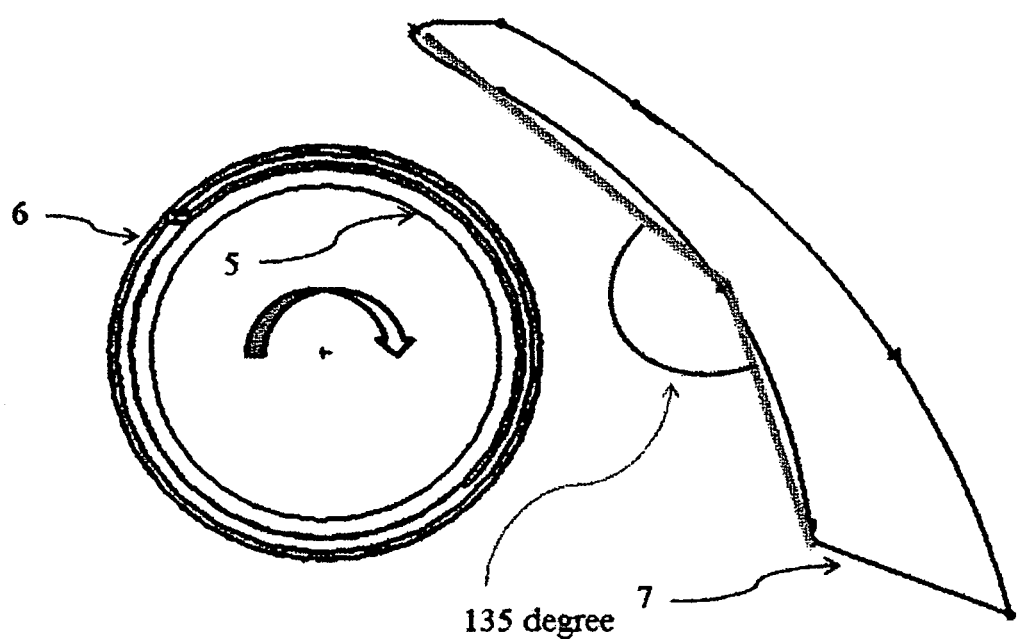
FIG. 7 is a perpendicular view showing a rotary column with an airfoil air flow directing plane. In the extreme end of this plane, there is an inclined plane installed according to embodiment 3.
Figure 8:
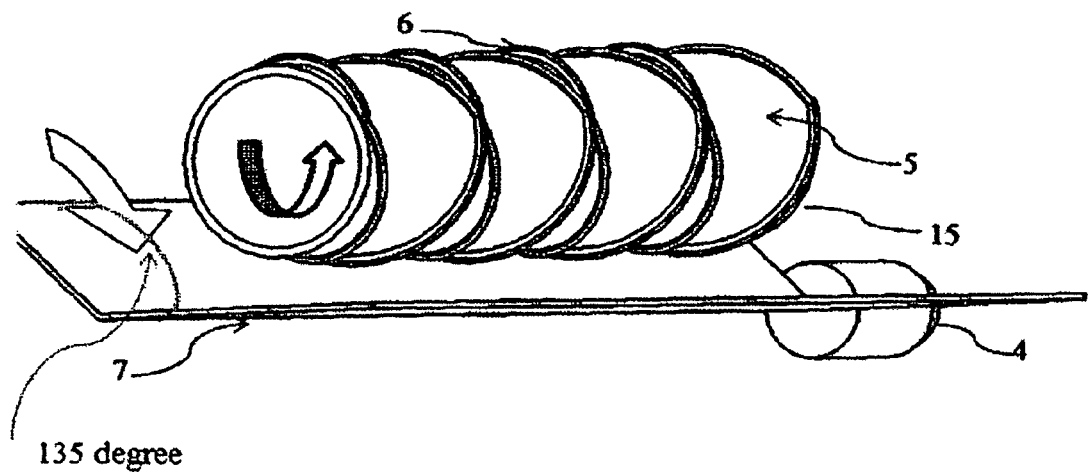
FIG. 8 is a perspective view showing the rotary columns with the air flow directing plane of a Magnus type wind power generator.
Figure 9:
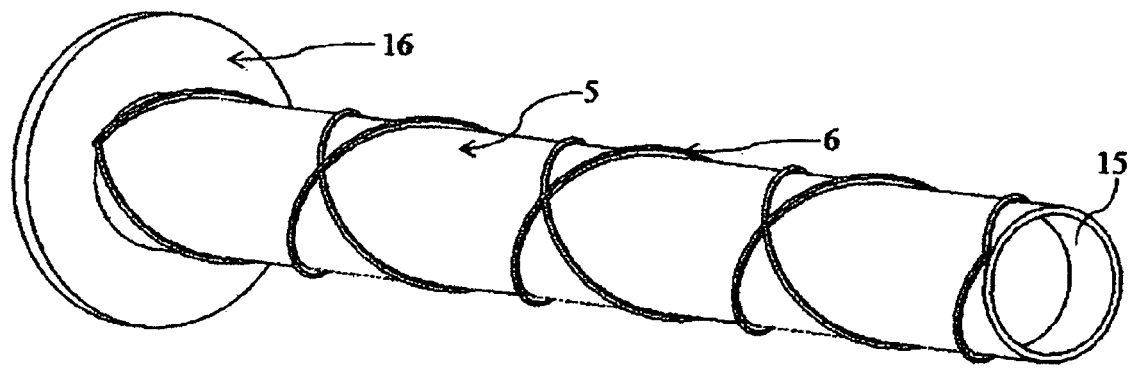
FIG. 9 is a perspective view showing the rotary columns with the clockwise and counter-clockwise (crossing) ribs provided with cap.

FIG. 7 is a front view showing a rotary column 5 with a curvature on the flow directing plane 7 according to the embodiment 3. Crossing ribs 6 are provided on the surface of the covering material of the rotary column 5 to generate more air flow. The material is made of a synthetic resin or weather resistant light alloy. According to this embodiment the flow directing plane 7 in the form of airfoil is used as air flow means. An inclined plane to the outside is shown in FIG. 7 in the extreme end of the plane. The flow directing plane 7 is installed at a certain distance in the back of the rotary column 5.

As shown in FIG. 7, there is a curvature in the end of the flow directing plane 7, and since this curvature disturbs air flows at the surface level (boundary level), the generated Magnus lift Y is increased.

Although the embodiments according to the present invention have been described with reference to the drawings, specific configurations are not limited to these embodiments, and the present invention includes modifications and additions within a scope not departing from the gist of the present invention.

For example, although the flow directing plane 7 is provided as the air flow means applied to the rotary columns, the present invention is not limited to this, and it is apparent that the air flow may be generated in any methods as long as a surface which generates lift is formed in the back of the rotary columns.

Further, although the end caps in the disk shape are provided upon the extreme end surfaces of the rotary columns, the present invention is not limited to this, and the end cap can be any shape as long as it serves to maintain a difference in pressure between the positive pressure and the negative pressure.

It should be noted that although the six rotary columns are provided upon the rotary body in the above embodiments, the present invention is not limited to this, and there may be provided two, three, or a required number of the rotary columns.

INDUSTRIAL APPLICABILITY

The Magnus type wind power generator according to the present invention can have a wide range of application from a large-scale wind power generation to a household small wind power generation, resulting in a substantial contribution to the wind power generation industry. Moreover, when the Magnus type lift generation mechanism according to the present invention is applied to rotor ships, rotor vehicles, and the like, it is expected that an efficiency of mobility of the vehicles increase.

It is understood that the above description and drawings are illustrative of the present invention and that changes may be made in materials, method steps without departing from the scope of the present invention as defined in the following claims.

The invention claimed:

1. A Magnus type power generator comprising:
a horizontal rotary shaft having a rotary body that transmits a rotation torque to a power generating mechanism, wherein said rotary body comprises multiple driving motors;
multiple rotary columns disposed radially from an outer periphery of said rotary body, connected at their proximal end to said multiple driving motors, and at their distal end to end caps, said end caps having a disk shape of a diameter larger than a diameter of said rotary columns;
wherein said rotary columns further comprise two crossing spiral ribs wound about said columns in a clock and counter clockwise direction respectively;
multiple air flow planes installed upon, and located behind an outer peripheral surface of said rotary columns;
wherein:
an air flow reaches said multiple columns before said air flow planes,
said air flow planes are parallel to said multiple columns and comprise two adjoining plates with a 135° angle there between, said air flow planes are stationary relative to said multiple columns, and said end caps direct said air flow towards said horizontal shaft.

2. The Magnus type power generator according to claim 1, wherein said air flow planes generate at least two air flow components, one of said components being parallel with an axis of said multiple columns upon said outer periphery surface of said multiple columns, and another one of said components being in a direction departing from said horizontal rotary shaft upon said outer peripheral surface of said rotary columns.

3. The Magnus type power generator according to claim 2, wherein more air is directed upon a surface of said multiple columns towards a high pressure area, without increasing a diameter or rotational speed of said horizontal rotary shaft.

4. The Magnus type power generator according to claim 3, wherein:

said air flow plane comprises a bent/inclined shape plane;

at a back of said air flow plane a speed of said air flow is near zero, said air flow has maximum speed and minimum pressure at a front portion of said inclined/bent shape plane; and said front of said inclined/bent shaped plane faces said multiple columns.

5. The Magnus type power generator according to claim 4, wherein said rotation speed of said multiple columns are adjusted between high and low, and therefore electric power is generated while said rotation speed of said multiple columns fluctuates.

6. The Magnus type power generator according to claim 5, wherein less number of said driving motors than a required number of said multiple columns is used in order to rotate said multiple columns simultaneously.

7. The Magnus type power generator according to claim 6, wherein said flow directing planes comprise different shapes including defuse and airfoil.

8. The Magnus type wind generator according to claim 7, wherein said flow directing planes can be installed in different angles in said back of said multiple columns.

9. The Magnus type power generator according to claim 8, wherein said spiral crossing ribs direct said air flow.

\* \* \* \* \*